United States Patent
Park et al.

(10) Patent No.: US 10,342,068 B2
(45) Date of Patent: Jul. 2, 2019

(54) METHOD FOR TRANSMITTING DATA IN WIRELESS COMMUNICATION SYSTEM AND DEVICE USING SAME

(71) Applicant: LG ELECTRONICS INC., Seoul (KR)

(72) Inventors: Giwon Park, Seoul (KR); Dongcheol Kim, Seoul (KR); Byungjoo Lee, Seoul (KR); Hyunhee Park, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 15/549,899

(22) PCT Filed: Feb. 5, 2016

(86) PCT No.: PCT/KR2016/001359
§ 371 (c)(1),
(2) Date: Aug. 9, 2017

(87) PCT Pub. No.: WO2016/129915
PCT Pub. Date: Aug. 18, 2016

(65) Prior Publication Data
US 2018/0063884 A1    Mar. 1, 2018

Related U.S. Application Data

(60) Provisional application No. 62/114,082, filed on Feb. 10, 2015, provisional application No. 62/114,570, filed on Feb. 10, 2015, provisional application No. 62/115,610, filed on Feb. 12, 2015, provisional application No. 62/129,973, filed on Mar. 9, 2015.

(51) Int. Cl.
*H04W 84/18* (2009.01)
*H04W 28/02* (2009.01)
*H04W 72/12* (2009.01)
*H04W 72/14* (2009.01)
*H04W 52/02* (2009.01)

(52) U.S. Cl.
CPC ......... *H04W 84/18* (2013.01); *H04W 28/021* (2013.01); *H04W 52/0203* (2013.01); *H04W 52/0216* (2013.01); *H04W 72/121* (2013.01); *H04W 72/14* (2013.01); *Y02D 70/00* (2018.01); *Y02D 70/142* (2018.01); *Y02D 70/22* (2018.01)

(58) Field of Classification Search
CPC ........... H04W 72/121; H04W 72/1278; H04W 72/14; H04W 72/1289; H04W 72/1294
See application file for complete search history.

(56) References Cited

U.S. PATENT DOCUMENTS

| 2006/0285510 A1* | 12/2006 | Kim ...... H04W 88/02 370/312 |
| 2008/0298290 A1 | 12/2008 | Wentink |
| 2013/0235720 A1 | 9/2013 | Wang et al. |

(Continued)

FOREIGN PATENT DOCUMENTS

WO    2014-168640 A1    10/2014

*Primary Examiner* — Christopher M Crutchfield
(74) *Attorney, Agent, or Firm* — Dentons US LLP

(57) ABSTRACT

A method and a device for transmitting data in a neighbor awareness network (NAN) are provided. A NAN device acquires a NAN association identifier (AID) from a unique identifier and receives a traffic indication map (TIM) information on the basis of a TIM offset. TIME offset is determined on the basis of the NAN AID.

11 Claims, 7 Drawing Sheets

(56) References Cited

U.S. PATENT DOCUMENTS

| | | | |
|---|---|---|---|
| 2014/0153560 A1* | 6/2014 | Zhou | H04W 56/001 370/350 |
| 2014/0198725 A1 | 7/2014 | Abraham et al. | |
| 2015/0036540 A1 | 2/2015 | Kasslin et al. | |
| 2015/0109981 A1* | 4/2015 | Patil | H04L 67/1078 370/311 |
| 2015/0127949 A1* | 5/2015 | Patil | H04L 9/0861 713/181 |
| 2016/0014715 A1* | 1/2016 | Patil | H04W 52/0216 370/329 |
| 2016/0227572 A1* | 8/2016 | Li | H04L 5/0094 |

* cited by examiner

METHOD FOR TRANSMITTING DATA IN WIRELESS COMMUNICATION SYSTEM AND DEVICE USING SAME

CROSS-REFERENCE TO RELATED APPLICATIONS

This application is the National Stage filing under 35 U.S.C. 371 of International Application No. PCT/KR2016/001359, filed on Feb. 5, 2016, which claims the benefit of U.S. Provisional Applications No. 62/114,082 filed on Feb. 10, 2015, No. 62/114,570 filed on Feb. 10, 2015, No. 62/115,610 filed on Feb. 12, 2015 and No. 62/129,973 filed on Mar. 9, 2015, the contents of which are all hereby incorporated by reference herein in their entirety.

BACKGROUND OF THE INVENTION

Field of the Invention

The present invention relates to wireless communication, and more particularly, to a method for transmitting data in a wireless communication system, and a device using the same.

Related Art

Generally, a wireless communication system allows communication between user equipments (UEs) via a management medium, such as a base station or an access point (AP). The management medium is responsible for scheduling for data communication.

In order to secure flexibility in communication, various protocols for direct communication between devices without a management medium have been proposed. A neighbor awareness network (NAN) is a specification established by the Wi-Fi Alliance (WFA) based on the Wi-Fi standard. The NAN specification specifies synchronization and discovery procedures between devices in a frequency band of 2.5 GHz or 5 GHz.

Currently, the NAN specification does not support data communication between devices. A protocol is provided for direct data transmission between neighboring devices.

SUMMARY OF THE INVENTION

The present invention provides a method for transmitting data in a neighbor awareness network (NAN) and a device using the same.

In an aspect, a method for transmitting data in a neighbor awareness network (NAN) is provided. The method includes acquiring, by an NAN device, a NAN association identifier (AID) from a unique identifier, determining, by the NAN device, a traffic indication map (TIM) offset for receiving TIM information for identifying whether there is buffered traffic based on the NAN AID, and receiving, by the NAN device, the TIM information from a transmission NAN device on the basis of the TIM offset.

The TIM offset may be determined based on the NAN AID and a number of devices in a specific group.

The TIM offset may be defined based on a discovery window used for synchronization of devices in a cluster to which the NAN device belongs.

In another aspect, a device for transmitting data in a neighbor awareness network (NAN) includes a transceiver configured to transmit and receive a radio signal, and a processor coupled to the transceiver. The processor is configured to acquire a NAN association identifier (AID) from a unique identifier, determine a traffic indication map (TIM) offset for receiving TIM information for identifying whether there is buffered traffic based on the NAN AID, and receive, through the transceiver, the TIM information from a transmission NAN device on the basis of the TIM offset.

It is possible to reduce the power consumption of a device and to transmit traffic data in a neighbor awareness network (NAN).

DESCRIPTION OF EXEMPLARY EMBODIMENTS

A neighbor awareness network (NAN) is a specification established by the Wi-Fi Alliance (WFA) based on the Wi-Fi standard. An NAN device is a device that supports the NAN specification. The NAN device may support various communication protocols and may be part of a station (STA) or part of an access point (AP). The STA may be fixed or mobile and may be referred to as a different term, such as a user equipment (UE), a mobile station (MS), a mobile terminal (MT), a user terminal (UT), a subscriber station (SS), a personal digital assistant (PDA), a wireless modem, a handheld device, or the like.

The NAN device may operate in a frequency band of 2.5 GHz or 5 GHz and may exchange information based on the Institute of Electrical and Electronics Engineers (IEEE) 802.11a/b/g/n/ac protocols.

The NAN device may retrieve a service of a neighboring device using an NAN protocol, may run an application, and may connect to a wireless local area network (WLAN) or another network, thereby using the retrieved service.

Figure 1:
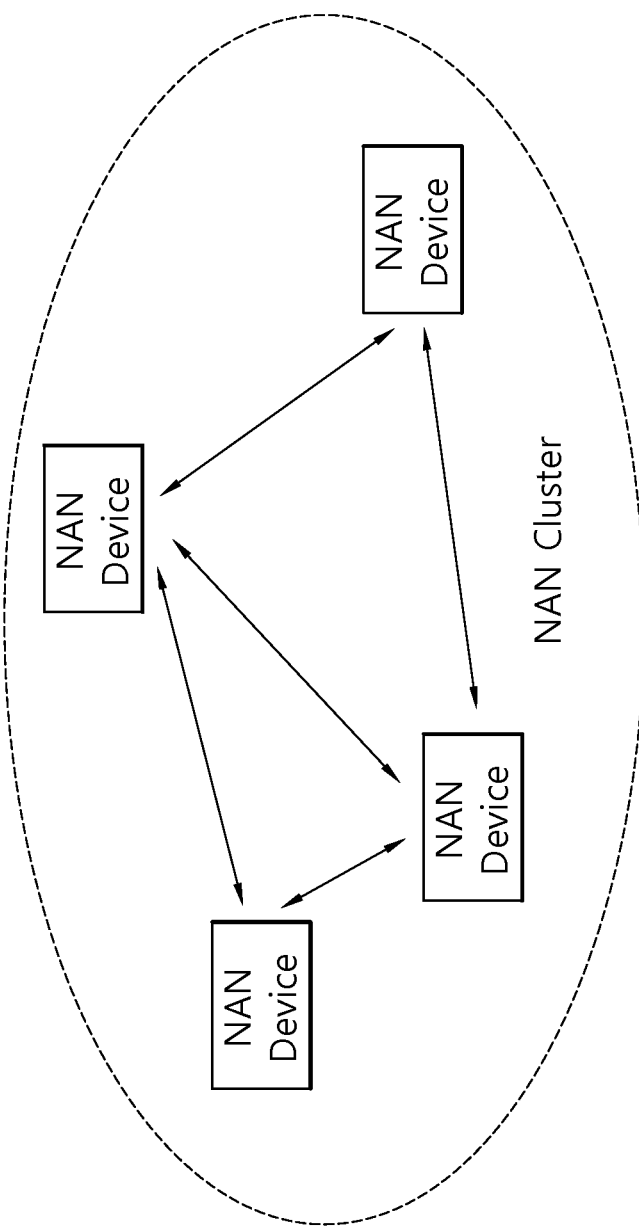
FIG. 1 shows an example of neighbor awareness network (NAN) topology.

FIG. 1 shows an example of NAN topology.

An NAN cluster may be a set of NAN devices that share a set of NAN parameters and synchronize to the same discovery window schedule. NAN devices participating in the same NAN cluster synchronize to a communal clock. An NAN parameter may include at least one of discovery window duration, a discovery window interval, and an NAN channel. A discovery window interval refers to a gap between consecutive discovery windows.

An NAN network may include at least one NAN cluster. An NAN device may participate in one or more NAN clusters.

An NAN device in an NAN cluster may operate as a master role or a non-master role. An NAN device operating as a master role may transmit a synchronization beacon frame and a discovery beacon frame. An NAN device operating as a non-master role in a synchronous state may not transmit a discovery beacon frame. An NAN device operating as a non-master role in an asynchronous state may not transmit a synchronization beacon frame and a discovery beacon frame. All NAN devices may transmit a service discovery frame.

A synchronization beacon frame is used to synchronize NAN devices in an NAN cluster. A discovery beacon frame is used for advertisement such that an NAN device not joining an NAN cluster discovers the cluster. A service discovery frame is used to exchange information on a service between NAN devices.

Figure 2:
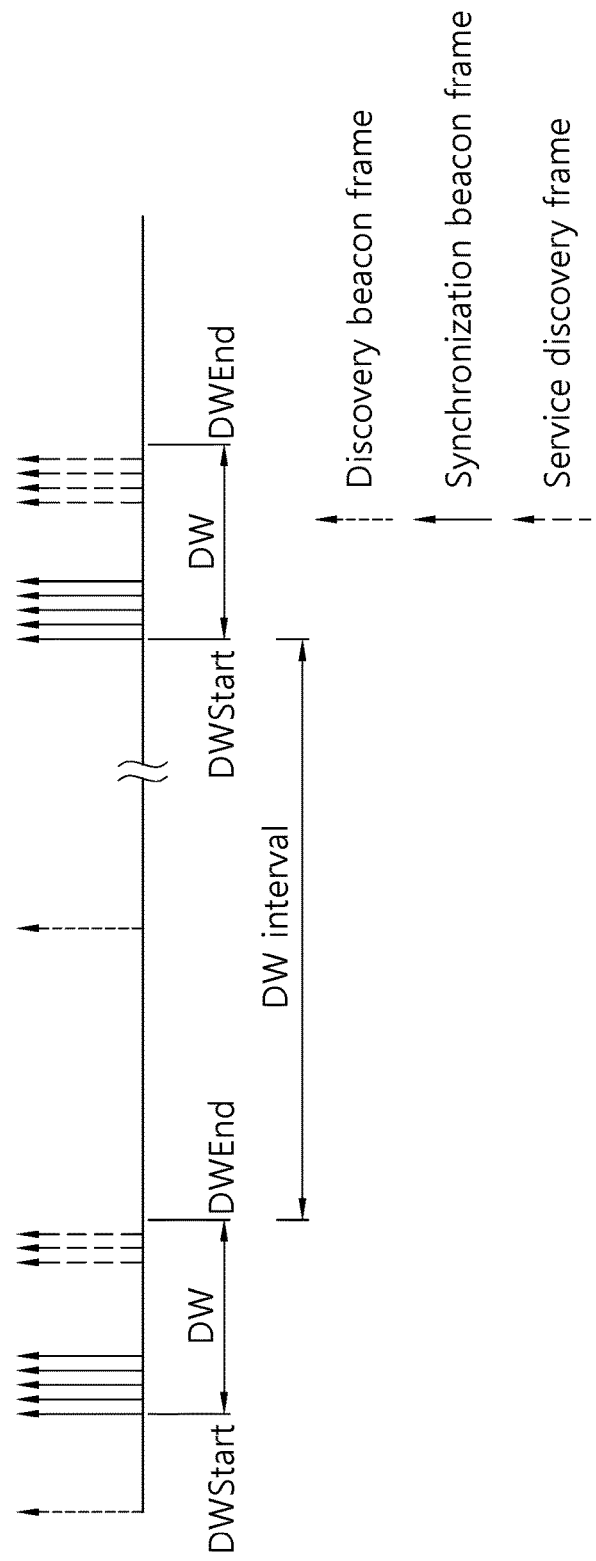
FIG. 2 shows an operation in a discovery window.

FIG. 2 shows an operation in a discovery window.

A discovery window (DW) may be a time and channel on which NAN devices converge.

During a discovery window, one or more NAN devices may transmit a synchronization beacon frame so that all NAN devices in an NAN cluster may be synchronized. One NAN device may transmit one synchronization beacon frame during one discovery window.

Between discovery windows, one or more NAN devices may transmit a discovery beacon frame so that the NAN devices may discover an NAN cluster.

During a discovery window, an NAN device may transmit a service discovery frame on the basis of contention. The NAN device may start a backoff timer set to a random value, and may transmit the service discovery frame when the value of the backoff timer is 0.

Figure 3:
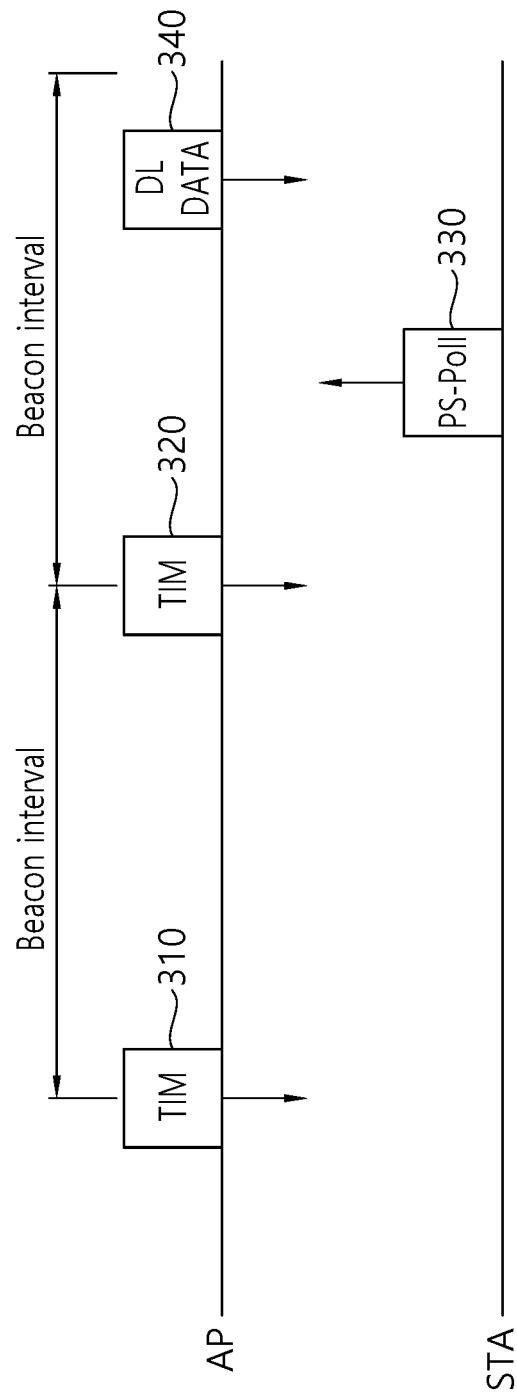
FIG. 3 shows an example of a power management operation in a wireless local area network (WLAN) according to a related art.

FIG. 3 shows an example of a power management operation in a WLAN according to a related art.

An AP transmits a beacon frame with a traffic indication map (TIM) in each beacon interval. The TIM includes information indicating whether the AP has downlink (DL) data to transmit to an STA.

The STA receives a first TIM 310, and switches to a sleep mode when identifying that there is no data to be received by the STA. The STA wakes up again in a next beacon interval and receives a second TIM 320. Upon identifying that there is data to be received by the STA, the STA transmits a power save (PS)-poll frame 330 to the AP and stands by in a wake-up mode. Upon receiving the PS-poll frame 330, the AP transmits DL data 340 to the STA.

In a general mobile network, a TIM may correspond to a paging message, and a beacon interval may correspond to a paging cycle.

In a WLAN, an STA knows in advance a beacon interval in which a beacon frame is transmitted. That is, an AP informs the STA of information on the beacon interval, and the STA wakes up at the time when the beacon frame is transmitted and receives a TIM in the beacon frame.

However, in an NAN, it may increase power consumption that an NAN device attempts to receive a TIM from an opponent NAN device in each particular interval. An existing TIM is based on one-to-many communication, in which all STAs managed by an AP receive the TIM. However, the NAN is based on peer-to-peer (P2P) communication, in which only a specific NAN device needs to receive a TIM.

In addition, in the WLAN, a TIM is designed based on an association identifier (AID). An AID is a 16-bit identifier for an STA assigned by the AP. In a basic service set (BSS) managed by an AP, an STA has a unique AID. An STA identifies the location thereof from a bitmap in a TIM element based on the AID thereof. In the NAN, however, NAN devices allocate AIDs between each other based on P2P-based, but it is not guaranteed whether the AIDs are unique in a cluster.

Figure 4:
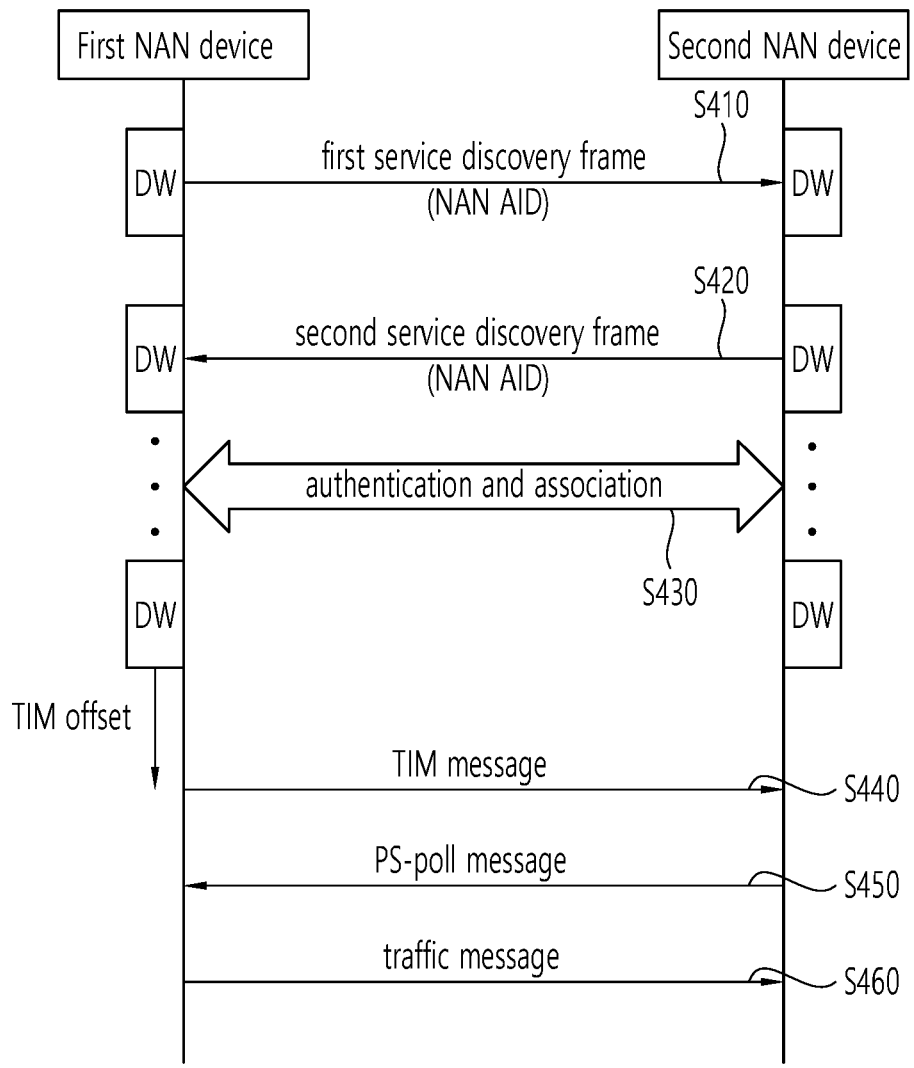
FIG. 4 shows a data transmission method according to an embodiment of the present invention.

FIG. 4 shows a data transmission method according to an embodiment of the present invention.

A first NAN device determines an NAN AID thereof. A second NAN device determines an NAN AID thereof. An NAN AID is an identifier arbitrarily set by each NAN device. For example, an NAN device may determine an NAN AID based on a 48-bit medium access control (MAC) address. An NAN AID may be 16 bits or 24 bits in size but is not limited in size. For example, the 16 least significant bits (LSBs) of an MAC address may be defined as an NAN AID.

The first NAN device transmits a first service discovery frame to the second NAN device during a first discovery window (S410). The service discovery frame may include the NAN AID of the first NAN device. The service discovery frame may further include an ID of a cluster to which the first NAN device belongs, and information on a service supported by the first NAN device.

The second NAN device transmits a second service discovery frame to the first NAN device during a second discovery window (S420). The service discovery frame may include the NAN AID of the second NAN device. The service discovery frame may further include an ID of a cluster to which the second NAN device belongs, and information on a service supported by the second NAN device.

The first NAN device and the second NAN device perform authentication and association procedures based on each NAN AID (S430).

When there is buffered traffic to be sent to the second NAN device, the first NAN device transmits a TIM message to the second NAN device (S440).

In one embodiment, the TIM message may be transmitted based on contention during the discovery window.

In another embodiment, the first NAN device and the second NAN device may share information on when the TIM message is to be transmitted. For example, suppose that an interval in which the TIM message is transmitted at the end point of the discovery window is a TIM offset. The first and second NAN devices may exchange information on the TIM offset through the authentication and association procedures or a service discovery frame.

In still another embodiment, each NAN device may determine a TIM offset based on the NAN AID, which will be described later.

The second NAN device, which identifies through the TIM message that there is buffered traffic, transmits a PS-poll message to the first NAN device (S450). The PS-poll message may include the NAN AID of the second NAN device.

The first NAN device transmits traffic data to the second NAN device (S460).

Hereinafter, a method in which an NAN device determines a TIM offset is described.

An NAN device may determine a TIM offset based on at least one of an NAN AID and the number of NAN devices in a particular group. The particular group may be a cluster or a group of NAN devices for paging. Information on the number of NAN devices in the particular group may be shared through authentication and association procedures. The information on the number of NAN devices in the particular group may be included in a service discovery frame, a synchronization beacon frame, or a discovery beacon frame.

The TIM offset starts from the end point of a discovery window, which is only an example. The TIM offset may start from the start point or any point of the discovery window. The NAN device may receive a TIM message after the TIM offset.

During the TIM offset, the NAN device may operate in the sleep mode to reduce power consumption. After the TIM offset, the NAN device may switch to the wake-up mode to receive the TIM message.

The TIM offset may be defined by {(DWi−DWd)/Num_Cluster}*(NAN AID mod Num_Cluster). DWi is a discovery window interval, DWd is discovery window duration, Num_Cluster is the number of NAN devices in the cluster, and NAN AID is an ID of the NAN device to receive a TIM. Alternatively, the TIM offset may be defined by {(DWi−DWd)/Num_PG}*(NAN AID mod Num_PG). Num_PG is the number of NAN devices in the NAN device group for paging.

For example, suppose that DWi=512 ms, DWd=16 ms, and Num_Cluster=4.

- When (NAN AID mod 4)=0, {(512−16)/4}*0=0, which means that the NAN device may receive the TIM message from the end point of the discovery window.
- When (NAN AID mod 4)=1, {(512−16)/4}*1=124 ms, which means that the NAN device may receive TIM messages 124 ms after the end point of the discovery window.
- When (NAN AID mod 4)=2, {(512−16)/4}*2=248 ms, which means that the NAN device may receive TIM messages 248 ms after the end point of the discovery window.
- When (NAN AID mod 4)=3, {(512−16)/4}*3=372 ms, which means that the NAN device may receive the TIM message 372 ms after the end point of the discovery window.

Figure 5:
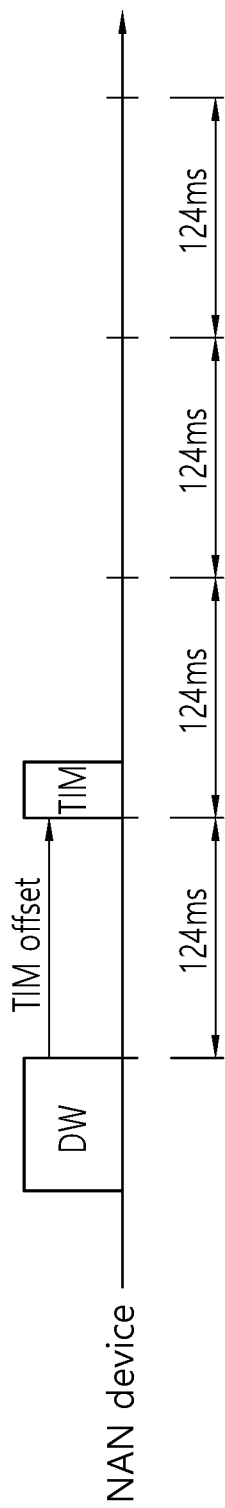
FIG. 5 shows an example of receiving a traffic indication map (TIM) message.

FIG. 5 shows an example of receiving a TIM message.

A case where (NAN AID mod 4)=1 is illustrated. An NAN device may transition to the sleep mode during a TIM offset=124 ms after a discovery window (DW) expires. After the TIM offset, the NAN device transitions to the wake-up mode and receives a TIM message.

A transmission NAN device to transmit the TIM message determines the TIM offset based on an NAN AID of a reception NAN device to receive buffered traffic. The transmission NAN device may transmit the TIM message including the NAN AID of the reception NAN device to the reception NAN device after the TIM offset.

When the TIM message includes information on the NAN AID of the reception NAN device, the reception NAN device may transmit a PS-poll message to the transmission NAN device.

The TIM message refers to a message having TIM information indicating that there is buffered traffic and is not limited by a name. The TIM message may be referred to as a paging message or a transmission indication message. The TIM message may be included in a synchronization beacon frame, a discovery beacon frame, or the like.

The PS-poll frame refers to a message for requesting transmission of buffered data and is not limited by a name. The PS-poll frame may be referred to as a paging response message or a transmission request message.

Figure 6:
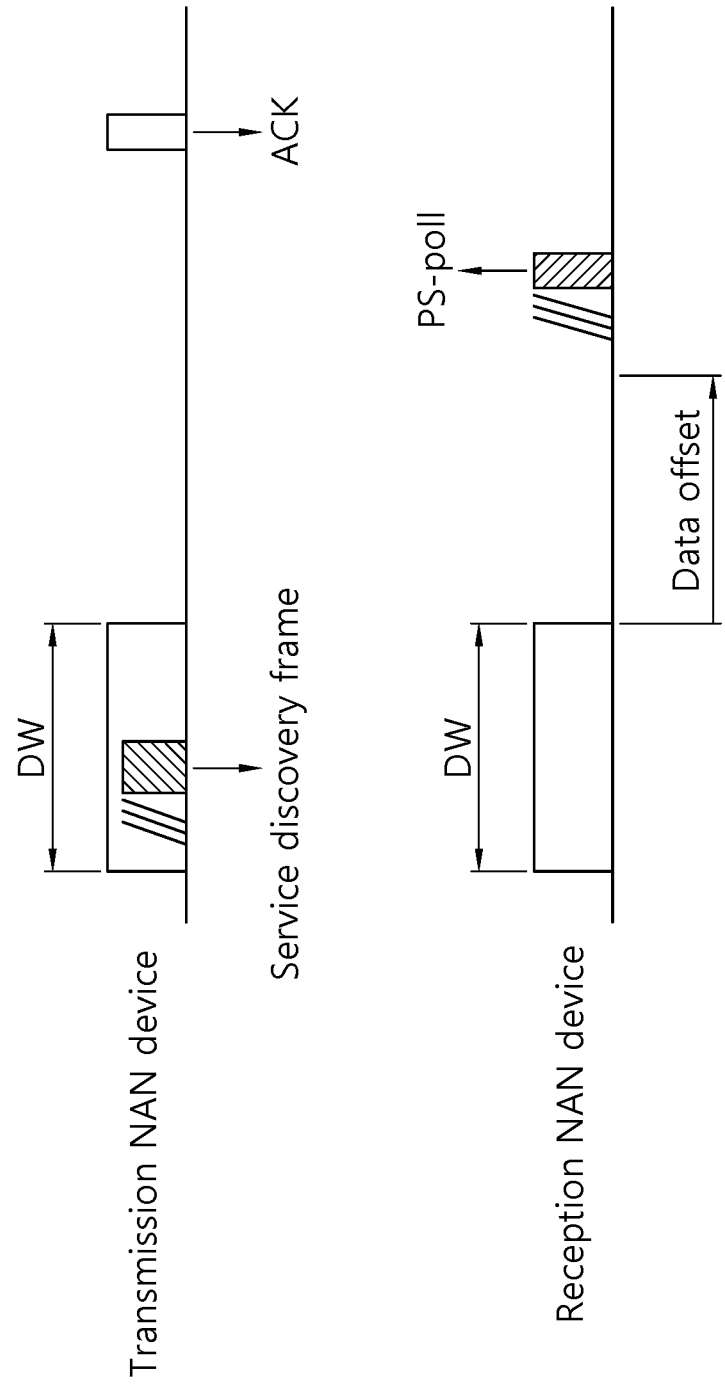
FIG. 6 shows a data transmission method according to another embodiment of the present invention.

FIG. 6 shows a data transmission method according to another embodiment of the present invention. Suggested is that a TIM is received during a discovery window and a PS-poll message is transmitted based on a data offset.

Suppose that a transmission NAN device stores traffic data to send to a reception NAN device in a buffer. The transmission NAN device sends, to the reception NAN device, TIM information indicating that there is buffered data. The TIM information may include an NAN AID of the reception NAN device. The TIM information may be included in a service discovery frame transmitted during a discovery window. During the discovery window, the transmission NAN device may perform a backoff, and may transmit the service discovery frame if a channel is not busy.

The reception NAN device, which has identified through the TIM information that there is buffered data, may perform a backoff after a data offset, and may transmit a PS-poll frame if the channel is not busy.

The data offset starts from the end point of the discovery window, which is only an example. The data offset may start from the start point or any point of the discovery window.

When the PS-poll message is received, the transmission NAN device may transmit an ACK message and may transmit the traffic data.

When the reception NAN device receives the service discovery frame including the NAN AID of the reception NAN device during the discovery window, the reception NAN device identifies that the transmission NAN device has buffered traffic. During the data offset, the reception NAN device switches to the sleep mode to reduce power consumption. After the data offset, the reception NAN device switches to the wakeup mode to check whether the channel is idle. When the channel is idle, the reception NAN device transmits the PS-poll message to the transmission NAN device. Upon receiving an ACK of the PS-poll from the transmission NAN device, the reception NAN device subsequently receives the traffic data The NAN device may determine the data offset based on at least one of an NAN AID and the number of NAN devices in a particular group. The particular group may be a cluster or a group of NAN devices for paging. Information on the number of NAN devices in the particular group may be shared through authentication and association procedures. The information on the number of NAN devices in the particular group may be included in a service discovery frame, a synchronization beacon frame, or a discovery beacon frame.

The data offset may be defined by {(DWi-DWd)/Num_Cluster} *(NAN AID mod Num_Cluster). DWi is a discovery window interval, DWd is discovery window duration, Num_Cluster is the number of NAN devices in the cluster, and NAN AID is an ID of the NAN device to receive a TIM. Alternatively, the data offset may be defined by {(DWi-DWd)/Num_PG}*(NAN AID mod Num_PG). Num_PG is the number of NAN devices in the NAN device group for paging.

For example, suppose that DWi=512 ms, DWd=16 ms, and Num_Cluster=4.

- When (NAN AID mod 4)=0, {(512−16)/4}*0=0, which means that the NAN device may transmit the PS-poll message from the end point of the discovery window.
- When (NAN AID mod 4)=1, {(512−16)/4}*1=124 ms, which means that the NAN device may transmit the PS-poll message 124 ms after the end point of the discovery window.
- When (NAN AID mod 4)=2, {(512−16)/4}*2=248 ms, which means that the NAN device may transmit the PS-poll message 248 ms after the end point of the discovery window.
- When (NAN AID mod 4)=3, then {(512−16)/4}*3=372 ms, which means that the NAN device may transmit the PS-poll message 372 ms after the end point of the discovery window.

Figure 7:
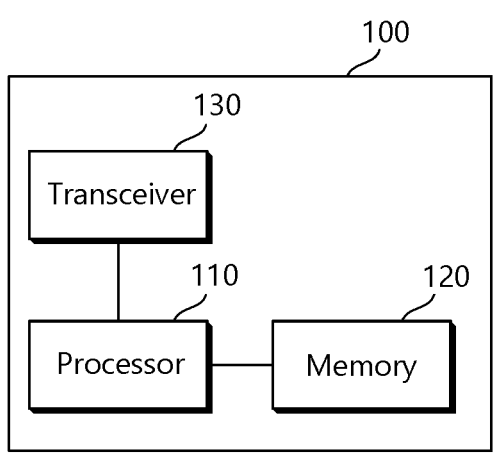
FIG. 7 is a block diagram illustrating a wireless communication system according to an embodiment of the present invention.

FIG. 7 is a block diagram illustrating a wireless communication system according to an embodiment of the present invention.

A device 100 includes a processor 110, a memory 120, and a transceiver 130. The memory 120 is coupled to the processor 110 and stores various instructions that are executed by the processor 110. The transceiver 130 is coupled to the processor 110 and transmits and/or receives radio signals. The processor 110 implements the proposed functions, processes and/or methods. In the embodiments described above, the processor 110 implements an NAN protocol, and may implement reception or transmission of TIM information and reception or transmission of a PS-poll. When the above-described embodiments are implemented by software instructions, the instructions may be stored in the memory 120 and may be executed by the processor 110, thereby performing the operations described above.

The processor may include Application-Specific Integrated Circuits (ASICs), other chipsets, logic circuits, and/or data processors. The memory may include Read-Only Memory (ROM), Random Access Memory (RAM), flash memory, memory cards, storage media and/or other storage devices. The RF unit may include a baseband circuit for processing a radio signal. When the above-described embodiment is implemented in software, the above-described scheme may be implemented using a module (process or function) which performs the above function. The module may be stored in the memory and executed by the processor. The memory may be disposed to the processor internally or externally and connected to the processor using a variety of well-known means.

In the above exemplary systems, although the methods have been described on the basis of the flowcharts using a series of the steps or blocks, the present invention is not limited to the sequence of the steps, and some of the steps may be performed at different sequences from the remaining steps or may be performed simultaneously with the remaining steps. Furthermore, those skilled in the art will understand that the steps shown in the flowcharts are not exclusive and may include other steps or one or more steps of the flowcharts may be deleted without affecting the scope of the present invention.

What is claimed is:

1. A method for transmitting data in a neighbor awareness network (NAN), the method comprising:
    acquiring, by a first NAN device in a first group, a first NAN association identifier (AID) of the first NAN device from a predetermined unique identifier;
    transmitting, by the first NAN device, a first service discovery frame to a second NAN device, wherein the first service discovery frame includes the first NAN AID and first group information on a number of NAN devices in the first group;
    receiving, by the first NAN device, a second service discovery frame from the second NAN device in a second group, wherein the second service discovery frame includes a second NAN AID of a second NAN device and second group information on a number of NAN devices in the second group;
    determining, by the first NAN device, a traffic indication map (TIM) offset for a timing at which the second NAN device switches from a sleep mode to a wake-up mode based on the second NAN AID and the second group information; and
    transmitting, by the first NAN device, TIM information including the second NAN AID to the second NAN device after the timing, wherein the TIM information further includes information on whether there is buffered traffic for a station (STA);
    wherein when the information indicates there is buffered traffic for the STA in the TIM information, receiving, by the first NAN device, a power save (PS)-poll frame, from the second NAN device, requesting that the first NAN device transmit the buffered traffic to the second NAN device.

2. The method of claim 1, further comprising:
    performing, by the first NAN device an association procedure with the second NAN device based on the first NAN AID and the second NAN AID.

3. The method of claim 1, wherein, when the second NAN AID is included in the TIM information, the second NAN device identifies that the first NAN device has the buffered traffic for the second NAN device.

4. The method of claim 1, wherein the unique identifier comprises a medium access control (MAC) address of the NAN device.

5. The method of claim 4, wherein the first NAN AID has a smaller number of bits than the MAC address.

6. The method of claim 1, wherein the first group comprises one or more clusters.

7. The method of claim 1, wherein the TIM offset is defined based on a discovery window used for synchronization.

8. The method of claim 7, wherein the TIM offset is initiated at an end point of the discovery window.

9. A first neighbor awareness network (NAN) device in a first group for transmitting data in a NAN, the first NAN device comprising:
    a transceiver; and
    a processor, operative coupled to the transceiver, wherein the processor is configured to:
    acquire a first NAN association identifier (AID) of the first NAN device from a predetermined unique identifier;
    control the transceiver to transmit a first service discovery frame to a second NAN device, wherein the first service discovery frame includes the first NAN AID and first group information on a number of NAN devices in the first group;
    control the transceiver to receive a second service discovery frame from the second NAN device in a second group, wherein the second service discovery frame includes a second NAN AID of a second NAN device and second group information on a number of NAN devices in the second group;
    determine a traffic indication map (TIM) offset for a timing at which the second NAN device switches from a sleep mode to a wake-up mode based on the second NAN AID and the second group information; and
    control the transceiver to transmit TIM information including the second NAN AID to the second NAN device after the timing, wherein the TIM information further includes information on whether there is buffered traffic for a station (STA);
    wherein when the information indicates there is buffered traffic for the STA in the TIM information, receiving a power save (PS)-poll frame, from the second NAN device, requesting that the first NAN device transmit the buffered traffic to the second NAN device.

10. The device of claim 9, wherein, when the second NAN AID is included in the TIM information, the second NAN device identifies that the first NAN device has the buffered traffic for the second NAN device.

11. The device of claim 9, wherein the unique identifier comprises a medium access control (MAC) address of the NAN device.

* * * * *